Patented Apr. 16, 1935

1,998,375

UNITED STATES PATENT OFFICE 1,998,375

PROCESS FOR PRODUCING ESSENCE OF COCONUT AND SYNTHETIC COCONUT WATER

Eliseo Luque, Ponce, Puerto Rico, assignor to Luque and Fuertes, San Juan, Puerto Rico, a firm composed of Eliseo Luque and Luis R. Fuertes No Drawing. Application December 29, 1933, Serial No. 704,597

8 Claims. (Cl. 99—11)

This invention relates to a process for producing essence of coconut and synthetic coconut water.

Objects of the invention include the process for the production of essence of coconut that may be used for various purposes and especially for use in the manufacture of synthetic coconut water.

The medicinal properties of coconut water in its original state as obtained from the coconut are well known, coconut water being distinguished from a substance known as coconut milk, but the use of this coconut water for medicinal uses or beverage purposes is extremely expensive as only comparatively small quantities of coconut water are obtainable from a large number of coconuts which renders the use of coconut water in its original state on a commercial basis prohibitive as to cost.

It is therefore the primary object of this invention to produce a synthetic coconut water possessing the medicinal values of coconut water in its original state, the synthetic coconut water being produced at an unusually low cost as compared with the expense of obtaining coconut water from the coconut.

In the growth of a coconut, the hard shell originally contains the coconut water which partially emulsifies by natural process for the deposit of nut meat or endosperm on the inner wall of the shell and a fully developed or grown coconut is entirely free of water contents. The ordinary coconut when obtained for use, still retains a small quantity of coconut water which has not been transformed into nut meat. It is to be noted that the liquid contents of a coconut is known as coconut water as distinguished from coconut milk that is obtained by first mixing water with coconut meat and then subjecting the same to an expressing operation to obtain coconut milk.

In this process for the production of synthetic coconut water the several steps embody the production of essence of coconut and this essence may be obtained by the treatment of the meat of the coconut to produce coconut oil.

To produce coconut oil, one method embodies the method of crushing fresh coconut meat to be mixed with water and relative proportions may comprise the crushed meat of one coconut to which is added about one (1) pint of water. This mixture is then expressed to obtain a substance known as coconut milk which is distinct from the original water in the coconut. The milk is then boiled or autoclaved to be reduced to coconut oil, the quantities mentioned producing about one-half (½) pint of coconut oil. If desired, the coconut oil may be obtained in any preferred manner to constitute the basis for the production of essence of coconut to be used in the manufacture of synthetic coconut water.

To produce essence of coconut, proportions of ingredients may include 100 grams of coconut oil to which 100 grams of alcohol are added. This mixture is thoroughly agitated and 150 grams of boiling water are later added thereto. The mixture is then allowed to cool and settle and by precipitation, the 250 grams of water and alcohol settle to the bottom of a container while the 100 grams of coconut oil rise to the surface. The coconut oil is then drawn off or separated and the water and alcohol mixture constitutes the essence of coconut and is thoroughly imbued with coconut flavor and this is then thoroughly filtrated.

Synthetic coconut water is then produced in a most economical manner in view of the highly concentrated character of the essence of coconut. Relative proportions of the ingredients of the synthetic coconut water may embody:—

| | Percent |
|---|---|
| Water | 90.46 |
| Essence of coconut | 1.40 |
| Potassium nitrate | 1.00 |
| Sugar | 7.00 |
| Benzoate of soda | .14 |
| | 100.00 |

The addition of sugar to the mixture produces a slightly sweet pleasant taste and removes any acrid effects from the synthetic coconut water. The medicinal value of potassium nitrate is well known and in the present mixture, its function, is to act upon the kidneys and bladder as an effective stimulant and eliminator. Benzoate of soda is added only in a quantity to effect preservation of the mixture. The water is carbonated, the synthetic coconut water when bottled and sealed effervesces when opened for use and is of the appearance of clear water.

There is thus produced a synthetic coconut water possessing all of the medicinal properties of the water present in a coconut shell and in fact, is of a more palatable character, more effective in accomplishing its functions and is produced by this process at a greatly reduced cost. It will be observed that only 1.4 of essence of coconut is added to 90.46 of clear water, the other ingredients in the proportions named, and the essense of coconut being highly concentrated, the synthetic coconut water is materially improved over the original water found in the coconut.

The synthetic coconut water is highly beneficial for the treatment of kidney and bladder disorders and produces no deleterious effects, the same possessing medicinal properties and it is effective as a refuse eliminator when taken internally and is a most refreshing beverage. The water in which the essence of coconut is mixed is carbonated and the sealed bottles or containers when opened cause the water to effervesce and sparkle similar to champagne and like beverages.

There is thus disclosed a process for the production of essence of coconut and synthetic coconut water and while the essence of coconut is primarily intended for the production of synthetic coconut water, it is to be understood that the same may be used in the carrying out of other processes as desired. It is understood that the steps of the process may be varied within the limits of the subject matter claimed.

I claim:—

1. The process of producing synthetic coconut water consisting of preparing a mixture of coconut oil and alcohol, then adding boiling water, then separating the coconut oil from the water and alcohol with the water and alcohol constituting essence of coconut and then adding water to the essence of coconut.

2. The process of producing synthetic coconut water consisting of preparing a mixture of coconut oil and alcohol, then adding boiling water, then separating the coconut oil from the water and alcohol with the water and alcohol constituting essence of coconut and then adding water and a preservative to the essence of coconut.

3. The process of producing synthetic coconut water consisting of preparing a mixture of coconut oil and alcohol, then adding boiling water, then separating the coconut oil from the water and alcohol with the water and alcohol constituting essence of coconut and then adding water, potassium nitrate, sugar and benzoate of soda to the essence of coconut.

4. In the manufacture of synthetic coconut water, the process of producing essence of coconut consisting of preparing a mixture of coconut oil and alcohol, then adding boiling water and then separating the coconut oil with the water and alcohol constituting essence of coconut.

5. The process of producing synthetic coconut water consisting of mixing 100 grams of coconut oil and 100 grams of alcohol, then adding 150 grams of boiling water, removing the water and alcohol that constitutes essence of coconut and then adding 90.46% of clear water to the essence of coconut in the ratio of 1.40% of the latter.

6. The process of producing synthetic coconut water consisting of boiling 100 grams of coconut oil and 100 grams of alcohol, then adding 150 grams of boiling water, removing the water and alcohol that constitutes essence of coconut and then adding 90.46% of clear water, potassium nitrate 1.%, sugar 7.% and benzoate of soda .14%.

7. In the manufacture of synthetic coconut water, the process of producing essence of coconut consisting of mixing 100 grams of coconut oil and 100 grams of alcohol, then adding 150 grams of boiling water, and then removing the water and alcohol that constitutes essence of coconut.

8. The process of producing synthetic coconut water consisting of mixing fresh coconut meat and water, then expressing coconut milk therefrom, then boiling the milk to reduce the same to coconut oil, then mixing alcohol with the oil and mixing the same, then adding boiling water to the oil and alcohol, then separating the alcohol and water that constitutes essence of coconut and then adding the essence of coconut in small quantities to relatively large quantities of clear water to which a preservative is added.

ELISEO LUQUE.